Feb. 17, 1959 G. A. WALLDOV 2,874,048
WATER-SOLUBLE FISH BAIT AND METHOD
Filed Sept. 28, 1956
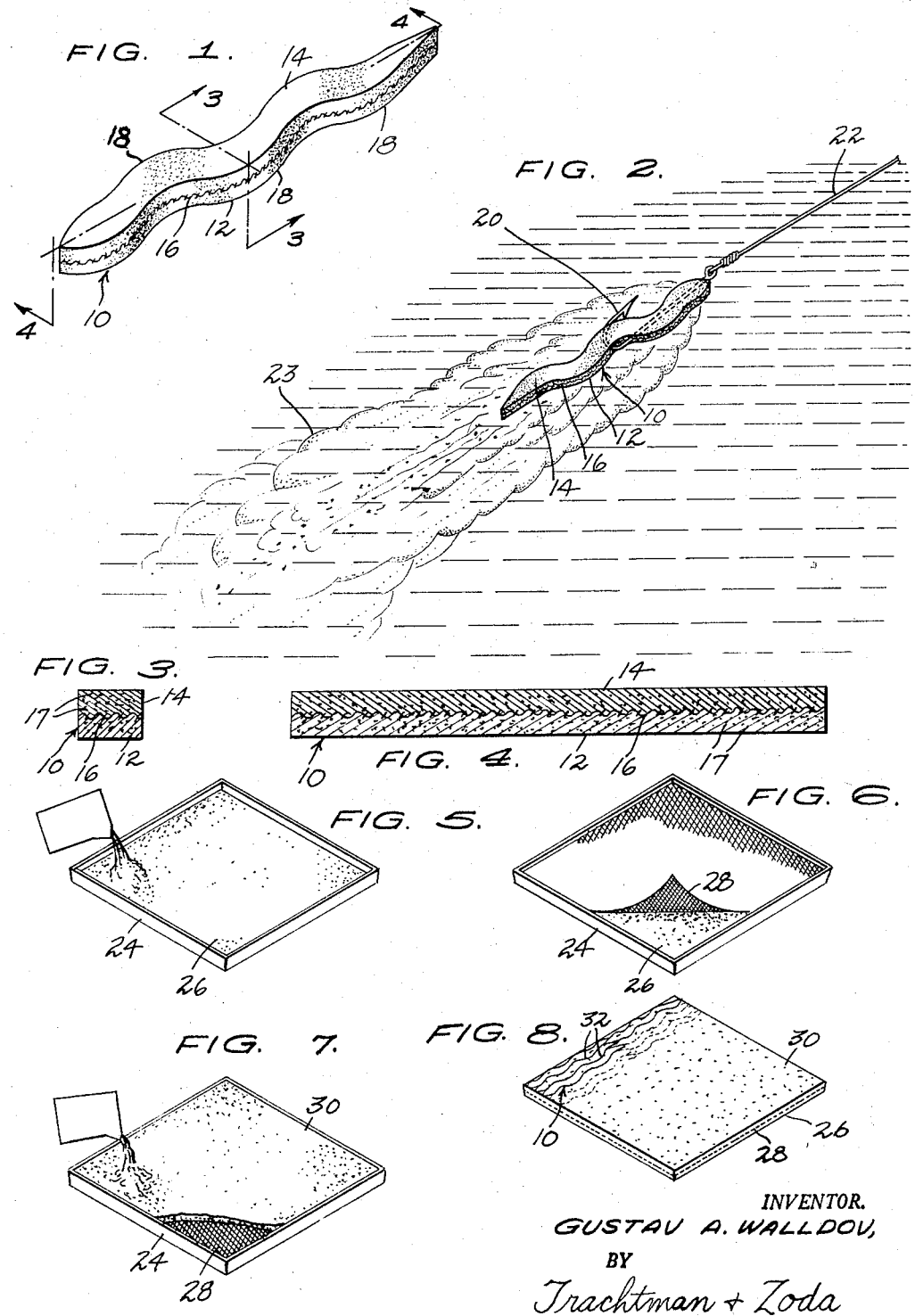
INVENTOR.
GUSTAV A. WALLDOV,
BY
Trachtman + Zoda
ATTORNEYS

2,874,048
Patented Feb. 17, 1959

2,874,048
WATER-SOLUBLE FISH BAIT AND METHOD

Gustav A. Walldov, Tennent, N. J.

Application September 28, 1956, Serial No. 612,837

6 Claims. (Cl. 99—3)

This invention relates to a manufactured, edible fish bait and to a process for making the same. More particularly, the bait comprises a dyed gelatinous body shaped as a worm, minnow, or other live bait, and slowly soluble in water to simulate bleeding of the bait, thus to make the same highly attractive to game fish. The invention comprehends the inclusion, in the soluble body, of an odor-producing or flavoring substance, discrete food particles of a lower solubility, or chemicals reacting in water to produce a flow of gaseous bubbles.

It is already known to flavor or impart odor to a fish bait. Further, I am aware of manufactured baits from which may flow a secretion in a manner to create a slick or cloud in the water about the bait.

To my knowledge, however, those baits that have so far been devised with a view to producing an effusion have in each instance included a body portion of a material not soluble in water, such as rubber, with the substance that is to be effused being normally confined in a capsule or the like within said body portion. Obviously, this limits to a marked extent the amount of secreted material that can be included in a single bait. Further, there is always present the possibility that the secretion may flow at an excessively retarded rate or not at all. Still further, the cost of manufacture of such artificial lures tends to be relatively high.

In view of the above, it is proposed, in carrying out the invention, to provide a bait-animal-simulating, gelatinous, carrier which (except for a fabric binder representing so inconsequential a portion of the total thickness of the bait as to be relatively immaterial) will be wholly soluble in water, so that throughout the time that it remains within the water, it will pay out a dyed or otherwise treated effusion trailing after the bait or flowing about the same to produce a simulated bleeding until the carrier is wholly dissolved. As distinguished from the effusion-creating baits heretofore devised, thus, my invention is one in which the body itself of the bait is the effused substance.

In this regard, it is a further object of the invention to form the carrier or body of a composition of material which will be particularly designed to insure that the dissolving of the carrier will proceed at a predetermined rate, so that the bait will be characterized by a particularly long period of effective use when submerged.

A further object is to form the water-soluble carrier in such manner that not only will it be adapted to contain, dispersed freely therethrough, a dye that will create the colored slick or effusion but also it will be adapted to contain, also dispersed through the full area of the body, any of various other substances such as bone meal or other food solids, odor-producing flavoring, and bubble-producing chemicals, which are continuously being released during the correspondingly continuous dissolving of the carrier.

A further object of importance is to provide a fish bait as described which will be designed for production through the following of a method capable of being practiced at relatively low cost, in a manner to permit mass production of inexpensive, disposable baits.

Yet another object is to produce the bait by means of a method or process which will permit the employment of relatively inexpensive materials, capable of being readily intermixed, and having the characteristic, when so intermixed, of resisting deterioration throughout the interval between manufacture of the bait and the use thereof by the ultimate purchaser.

Still another object of importance is to provide a fish bait as described which, though formed of a soft substance soluble in water, will be capable of being easily handled in ordinary commercial channels, due to a surface characteristic of the bait wherein there in an absence of tackiness, and wherein there is a pronounced resistance to melting under air temperatures to which it would normally be subjected in the mentioned interval.

Other objects will appear from the following description, the claims appended thereto, and from the annexed drawings, in which like reference characters designate like parts throughout the several views, and wherein:

Figure 1 is a perspective view of a fish bait according to the present invention;

Figure 2 is a perspective view of the bait on a reduced scale, as it appears when in use;

Figure 3 is a transverse sectional view substantially on line 3—3 of Figure 1;

Figure 4 is a longitudinal sectional view through the bait substantially on line 4—4 of Figure 1; and Figures 5 to 8 inclusive are perspective views showing the manufacture of the bait during succeeding steps of the process.

Referring to the drawings in detail, the bait constituting the present invention has been generally designated at 10. In the illustrated example, the bait is shaped to simulate a worm, such as a blood worm, night crawler, or the like. However, as will be apparent from the description to follow, the bait could be shaped and externally silvered or otherwise marked to simulate a minnow, a frog, or other bait animal.

In any event, the illustrated fish bait comprises a body or carrier which includes superposed, identically shaped laminations 12, 14, separated by and adhering to a fabric binder strip 16 that constitutes an intermediate lamination. The binder is of an outer configuration matching that of the laminations 12, 14, which are formed of the water-soluble material. Dispersed through the laminations 12, 14 is a dye 17, the particles of which have been exaggerated in the drawing for the purpose of clearly showing this feature.

As will hereinafter appear, the invention comprehends the selective inclusion—or omission—of flavoring or other substances, such as discrete particles of bone meal or other food solids.

In the vermiform shape embodied in the lure in the illustrated example, undulations 18 are formed, further adding to the faithfulness of the simulation of the bait to a fish worm. As a result, when the bait is impaled upon a hook 20 connected to a fishing line 22, it has the adaptability of attracting game fish in the vicinity, by reason of both the coloring and shape thereof, and on dissolving produces a dyed effusion 23 in which are contained the particles 17.

In this connection, the provision of the fabric binder 16 adapts the bait to be impaled upon a hook, and to remain in position upon the hook, despite the fact that the substance of which the laminations 12, 14 are formed is soluble in water. Obviously, the provision of a substance soluble in water, as the body of a fish bait, would, if said substance were soft, ordinarily make it difficult to maintain the same upon the fish hook 20. In fact, any soft substance that is completely soluble in water would ordinarily tend to tear away from the hook 20 almost immediately and would not be capable of effective utilization as a soluble bait designed to produce a blood-simulating slick.

However, if a substance soluble in water were initially hardened to an excessive degree, it would then be incapable of being readily penetrated by the hook, and would tend to be so brittle as to break when the hook were applied thereto. It is thus seen that the provision of a water-soluble substance as the body of a fish bait presents certain practical difficulties, in that first if the substance is too hard, it cannot be impaled by the hook, and would tend to break readily by reason of its inherent brittleness; and second, if the substance is soft, it could be readily impaled upon the hook, but would immediately tear away therefrom. Hence, the provision of soft, cohesive, soluble laminations 12, 14 in combination with a fabric binder 16 to which both of the laminations firmly adhere even while the bait is dissolving in the water, provides a solution to the practical difficulties previously mentioned.

I have discovered that gelatin, when combined with glycerin and other ingredients according to a process to be described in full detail hereinafter, will retain its shape throughout the interval between manufacture and use, will also retain its shape throughout the period that the lure is in the process of dissolving, will be sufficiently soft to permit its being readily impaled upon a hook, will dissolve at a comparatively slow rate, and will be characterized by its cohesiveness and lack of tackiness.

The process whereby the lure is made has been illustrated in Figures 5–8, and in carrying out the process, ingredients are used according to the following examples:

*Example 1*

| | Parts by weight |
|---|---|
| Gelatin | 64 |
| Glycerin | 8 |
| Dye | 1 |
| Flavoring (odor-producing) | 4 |
| Water | 128 |

The gelatin used will be ordinary gelatin, which is commercially produced in a powder and which may be of various grades. Any good commercial grade has been found to produce satisfactory results. The glycerin also is a commercial grade. A relatively high quality of glycerin has been found to be the most satisfactory.

With respect to the dye, ordinary vegetable dye is employed to advantage in the process, and can be of any color. For example, a red dye may be used to cause a blood-simulating cloud or slick when dispersed through the water on dissolving of the gelatinous substance of which the laminations 12, 14 are formed. Alternatively, the dye may be yellow, salmon, or even white. When a white or milky effusion is desired, it has been found that powdered milk is entirely satisfactory and in fact, in the dissolving of the fish lure, the powdered milk tends to come off in flakes, so that there are small solids mixed in the effusion or slick 23, which solids are attractive to fish. The dye which has been employed in practice has been in powdered form, but obviously could be in liquid form.

As to flavoring, the selection thereof will depend on the type of odor that is to be produced. Anise, in powdered form, has been found to be entirely satisfactory. Commercially produced essences sold to fishermen and having anise bases are also satisfactory. Anise oil could be used instead of a powdered form. Then again, a fish oil such as bunker oil could be employed. In every instance, the amount of dye and the amount of flavoring can be varied, according to the heaviness of the color which is to be imparted to the slick or to strength of the odor desired.

*Example 2*

The ingredients of Example 1 with the flavoring omitted.

*Example 3*

The ingredients of either Example 1 or Example 2, plus bone meal (4 parts).

*Example 4*

The ingredients of any one of Examples 1, 2, or 3, plus baking powder (4 parts).

By reason of the dispersal of the baking powder throughout the body and its consequent progressive exposure to the effects of water during the correspondingly progressive dissolving of the body, the baking powder has the effect of producing gas bubbles throughout the effusion of the body material in a cloud or slick. This "explosive" or bubbling action, in turn, is calculated to arouse still further the interest of game fish in the vicinity.

In carrying out the process whereby the ingredients of any of the specified examples are made up into the fish bait, a batch is preferably mixed in a double boiler. As a first step, the gelatin is mixed with the water while the water is still cold, since this tends to dissolve the gelatin more quickly. Heat is applied, until the gelatin is fully dissolved. The water temperature at which full dissolving occurs preferably is in an optimum range of 90–110 degrees F.

After the gelatin has been fully dissolved, the remaining ingredients are added. The order in which they are added is not critical and all can in fact be added simultaneously. At the time the other ingredients are added, the water may still be subjected to heat, with the temperature being, however, lowered sufficiently to merely maintain the water temperature at a level that will prevent solidifying of the gelatin while the other ingredients are being fully dispersed therethrough.

The solution is then poured into a tray 24 as shown in Figure 5, to provide a bottom layer 26 of the carrier material. When the solution in the tray begins to solidify, a cheese cloth 28 (Figure 6) is placed thereon, but it will be understood that the cheese cloth is not applied until such time as it will remain upon but will be fully embedded in the top surface of the layer 26. In other words, a certain amount of solidification will have occurred, sufficient to maintain the cheese cloth on the surface of the material while still assuring that it will be fully bonded to the top surface of the bottom layer, by flow of the gelatinous substance into the mesh of the fabric.

Thereafter, a time interval occurs during which there is further solidification of the bottom layer, to an extent such that when the top layer is applied, it will not press the cheese cloth down into the bottom layer any further than it has already been embedded.

Thereafter, a top layer 30 of the mixture, in a fully liquid state, is poured into the tray as shown in Figure 7. Then, the top layer is permitted to solidify until both layers have become completely solidified. When the upper layer is solidifying, it will in turn bond to the fabric lamination so that in effect, both laminations are bonded together by the fabric lamination disposed between the same.

As a next step, the product is subjected to refrigeration at a temperature above freezing, as for example at approximately 42° F. The only purpose of this step is to accelerate solidification and provide for easier handling of the material during further steps of the process.

Thereafter, the product is subjected to dehydration. This step is carried out by means of a blower or fan, so arranged that the air currents generated thereby impinge directly upon the surface of the substance. In this connection, it is highly desirable that the impinging air be characterized by relatively low humidity, and it has been found that good results are obtained, in the absence of a dehumidification chamber, by directing the generated air currents over an exposed resistance element prior to their impingement upon the product.

Dehydration is continued until the product is capable of removal from the tray without adherence to the surface thereof, and has cohesion sufficient to permit easy handling and clean cutting thereof during a die cutting operation that follows as the next step.

The individual baits are now cut out, after removal of the flat, laminated, cake-like product from the tray, by a die cutting operation. This is shown in Figure 8. The dies, not shown, would be of any desired shape, to produce the finished shape of the bait, and in commercial production a press would be used, permitting a large number of the articles to be cut simultaneously. For example, if the vermiform bait of Figure 1 is to be provided, the dies would cut the product along undulant lines 32, with the entire piece being cut in a single stroke of the die.

After the die cutting step has been completed, the individual baits are further dehydrated, in the manner previously described, for easier handling and improved keeping qualities, to any extent preferred by the manufacturer.

A very important characteristic of the invention resides in the fact that the binder permits the article to be impaled upon the hook without danger of the hook rending or tearing the gelatinous body to an extent such as would prevent the body from remaining upon the hook.

In this connection, the cheese cloth might not be disposed as a lamination and might overlie one or both faces of the gelatinous body. Further, the cheese cloth might be limited to that area of the body that is to receive the hook.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

I claim:

1. A fish bait comprising a laminate body the several laminations of which have their edges in full registration throughout the peripheries of said laminations, said body including a pair of outer laminations formed wholly of an edible, water-soluble material, said body additionally including an intermediate lamination interposed between and bonded to the outer laminations and comprising a flexible binder strip, said strip having over its entire area interstices of a size proportioned for ready penetration of the intermediate lamination by a fishhook and for entry of the material of the outer laminations into the interstices to bond the respective outer laminations to the intermediate lamination.

2. A fish bait as in claim 1 wherein each of the several laminations is of an outer configuration simulating that of a bait animal, the combined thicknesses of the several laminations approximating the thickness of the bait animal the configuration of which is simulated by the several laminations.

3. A fish bait as in claim 2 wherein the several laminations are each of constant thickness over its entire area.

4. A fish bait comprising an elongated, laminate body the several laminations of which have peripheral edges of a shape outlining a bait animal, said edges being in full registration throughout the peripheries of said laminations, said body including a pair of outer laminations formed wholly of a soft, edible, water-soluble material and an intermediate lamination appreciably thinner than each of the outer laminations, said intermediate lamination being interposed between and bonded to the outer laminations and comprising a flexible binder strip, said strip having over its entire area interstices of a size proportioned for ready penetration of the intermediate lamination by a fishhook and for entry of the material of the outer laminations into the interstices to bond the respective outer laminations to the intermediate lamination.

5. A fish bait comprising an elongated, laminate body the several laminations of which have undulant side edges producing the outline of a vermiform bait animal, said laminations being in full registration throughout their peripheries, the body including a pair of outer laminations of constant thickness over their entire areas and formed wholly of a soft, edible, water-soluble material, the body further including an intermediate lamination appreciably thinner than each of the outer laminations, the combined thicknesses of the several laminations approximating that of the bait animal, said intermediate lamination being interposed between and being bonded to the outer laminations and comprising a flexible binder strip having over its entire area interstices of a size permitting ready penetration of the intermediate lamination by a fishhook, the material of at least one of the outer laminations extending through the interstices and being bonded to the material of the other outer lamination as well as to the intermediate lamination.

6. A fish bait comprising an elongated, laminate body the several laminations of which have undulant side edges producing the outline of a vermiform bait animal, said laminations being in full registration throughout their peripheries, said body including a pair of outer laminations of constant thickness over their entire areas and formed wholly of a soft, edible material soluble in water and having a density preventing ready penetration of the same by water, for dissolution of the material mainly at the surfaces thereof directly impinged upon by water, said outer laminations each having an outer face and side surfaces exposed to impingement by water for progressive dissolution of the outer laminations inwardly from said outer faces and side surfaces thereof, the body further including an intermediate lamination appreciably thinner than each of the outer laminations, the combined thicknesses of the several laminations approximating that of the bait animal, said intermediate lamination being interposed between the outer laminations and being bonded thereto in contact with the inner faces of the outer laminations over the full area of said inner faces, whereby to maintain adherence of the outer laminations to the intermediate lamination throughout the progressive dissolution of the outer laminations, the intermediate lamination comprising a flexible binder strip having over its entire area interstices of a size permitting ready penetration of the intermediate lamination by a fishhook, the material of at least one of the outer laminations extending through the interstices and being bonded to the material of the other outer lamination as well as to the intermediate lamination.

References Cited in the file of this patent

UNITED STATES PATENTS

| 871,935 | Henzel | Nov. 26, 1907 |
| 2,054,565 | Stovall et al. | Sept. 15, 1936 |
| 2,555,088 | Irwin | May 29, 1951 |

OTHER REFERENCES

Pharmaceutical Formulas, vol. I, 12th ed., The Chemist and Druggist, London, 1953, pages 274–276.